US009639477B2

(12) United States Patent
Gove (10) Patent No.: US 9,639,477 B2
(45) Date of Patent: May 2, 2017

(54) MEMORY CORRUPTION PREVENTION SYSTEM

(71) Applicant: Oracle International Corporation, Redwood Shores, CA (US)

(72) Inventor: Darryl Gove, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 54 days.

(21) Appl. No.: 14/850,395

(22) Filed: Sep. 10, 2015

(65) Prior Publication Data

US 2017/0075817 A1 Mar. 16, 2017

(51) Int. Cl.
*G06F 12/10* (2016.01)
*G06F 12/1027* (2016.01)
*G06F 12/14* (2006.01)

(52) U.S. Cl.
CPC ...... *G06F 12/1027* (2013.01); *G06F 12/1425* (2013.01); *G06F 2212/1032* (2013.01); *G06F 2212/1052* (2013.01); *G06F 2212/684* (2013.01)

(58) Field of Classification Search
None
See application file for complete search history.

(56) References Cited

U.S. PATENT DOCUMENTS

| 5,450,563 A | * | 9/1995 | Gregor | G06F 12/0875 711/118 |
| 5,530,839 A | * | 6/1996 | Komoto | G06F 12/1475 711/163 |
| 5,845,331 A | * | 12/1998 | Carter | G06F 12/0292 711/152 |
| 6,745,306 B1 | * | 6/2004 | Willman | G06F 12/145 711/135 |
| 2004/0078536 A1 | * | 4/2004 | Chen | G06F 12/1466 711/164 |
| 2005/0081020 A1 | * | 4/2005 | Volp | G06F 9/3851 712/228 |
| 2006/0015748 A1 | * | 1/2006 | Goto | G06F 21/52 713/190 |

* cited by examiner

*Primary Examiner* — Kevin Verbrugge
(74) *Attorney, Agent, or Firm* — Meyertons, Hood, Kivlin, Kowert & Goetzel, P.C.

(57) ABSTRACT

In some embodiments, a memory corruption prevention process includes detecting a memory instruction of a program, where the memory instruction specifies a virtual memory address of data. The memory corruption prevention process further includes accessing, in response to the memory instruction, a translation lookaside buffer (TLB) using at least a portion of the virtual memory address. The memory corruption prevention process further includes, in response to accessing the TLB, obtaining a physical memory address corresponding to the virtual memory address, where the physical memory address corresponds to the data. The memory corruption prevention process further includes, in response to accessing the TLB, obtaining an authentication value corresponding to the physical memory address. The memory corruption prevention process further includes determining, using the authentication value, whether the memory instruction is authorized to proceed.

20 Claims, 6 Drawing Sheets

MEMORY CORRUPTION PREVENTION SYSTEM

BACKGROUND

Technical Field

This disclosure relates to computing systems, and, more particularly, to a memory corruption prevention system.

Description of the Related Art

Memory corruption occurs in several ways, including when the contents of a memory location are unintentionally modified due to programming errors. For example, accessing memory past the end of an array of bytes reserved for a particular data structure may result in memory corruption. In addition, memory corruption may occur when contents of a memory location are intentionally modified by a malicious attack. When the corrupted memory contents are used later in the computer program, it may lead either to a program crash or to unexpected program behavior. Some programming languages (for example, C and C++) include features such as explicit memory management and pointer arithmetic. These features allow development of efficient applications and system software. However, when a computer programmer incorrectly or maliciously uses these features, memory corruption may occur.

Different types of computer programming languages have different degrees of vulnerability to memory corruption. Consider "type safe" and "type unsafe" computer languages. A "type safe" computer language does not permit a computer programmer to use a value as a data type to which it does not belong. For example, a type safe language does not allow conversion of an integer variable to a pointer value. The C programming language, on the other hand, is one example of a "type unsafe" language. The C language is considered type unsafe due to use of casting, particularly the casting of pointers to a void data type and vice versa. The C++ programming language is also "type unsafe."

Similarly, a computer programming language may be characterized as "memory safe" when the language allows programs to release a portion of memory only when it is determined the portion of memory is unused for the remainder of the program evaluation. In contrast, a programming language that is "memory unsafe" may cause security vulnerabilities with random-access memory (RAM) access, such as buffer overflows and dangling pointers. Programming languages such as C and C++ that support arbitrary pointer arithmetic, casting, and deallocation are typically "memory unsafe." Some high-level programming languages are memory safe due to disallowing pointer arithmetic and casting, and by performing memory management techniques such as tracing garbage collection. However, programming efficiency may be reduced.

Many malicious attacks reduce system security through memory corruption and may exploit memory unsafe and/or type unsafe characteristics of a programming language. For example, a type unsafe language may not prevent programming errors such as allowing user input to be used as a pointer value. A malicious attacker may exploit such programming errors to create memory corruption attacks and access various portions of programs or data. Other examples of programming errors include vulnerabilities regarding buffer overflow, heap corruption (such as heap buffer overflow and double free), integer overflow, and format strings.

Accordingly, memory corruption comes in various forms and has various causes. When such corruption does occur, particularly in the application development process, it is desirable for a programmer to be able determine the memory access instruction that caused the corruption. But it is even more desirable to limit the number of occurrences of memory corruption in the first instance.

SUMMARY

Systems and methods for memory corruption prevention are contemplated.

In one embodiment, authentication values are utilized as part of execution of a computer program to detect memory corruption (e.g., memory access errors where data is improperly read from or stored to an incorrect memory location). In particular, in one embodiment, during execution of a computer program, authentication values are associated with memory locations of a physical memory. In response to a memory instruction, a processing circuit may obtain, based on a virtual memory address of the memory instruction, a physical address of one of the memory locations (e.g., using a translation lookaside buffer (TLB)). Additionally, the processing circuit may obtain a corresponding authentication value based on the virtual memory address. For example, the processing circuit may receive the physical address of the data and the physical address of the corresponding authentication value from the TLB. The processing circuit may compare the authentication value to an expected authentication value to determine whether the memory instruction is authorized to proceed. Additionally or alternatively, the authentication value may indicate whether the memory instruction is authorized to proceed. Accordingly, the authentication values may be utilized without the program needing to include software instructions that specifically address the authentication values.

In some cases, extra bits may be used to store authentication values. However, because such bits are limited in number and may be utilized for other purposes (e.g., replacing bits experiencing hardware failures or storing error correction code (ECC) data), in some embodiments, other memory locations are used. The other memory locations may, collectively, be larger than the extra bits. Thus, the other memory locations may include more information than the extra bits. In some cases, an authentication value stored at the other memory locations may refer to a smaller portion of a memory device, as compared to a system where extra bits of a memory device are used to store an authentication value.

These and other embodiments will become apparent upon reference to the following description and accompanying drawings.

While the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "translation lookaside buffer configured to store an authentication value address" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processor having eight processing elements or cores, the terms "first processing element" and "second processing element" can be used to refer to any two of the eight processing elements, and not, for example, just logical processing elements 0 and 1.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A corruption prevention system is disclosed that may detect memory corruption such as memory access errors in which data is improperly read from or stored to an incorrect memory location. In one embodiment, the corruption prevention system uses authentication values (e.g., "color" data or other program data) to determine whether a memory instruction is authorized to proceed. These authentication values may be stored at a memory device and, in some cases, additionally stored as part of a physical address of corresponding data (e.g., at a translation lookaside buffer (TLB)).

As used herein, "memory corruption" is used in a broad sense, and may take various forms and result from many different causes, including bad pointers, buffer overruns, malicious attacks, etc.

The authentication values may include different information in different embodiments. In particular, in some embodiments, the authentication values may include color data, which, when differing from expected color data, may indicate that a memory access error is occurring. Accordingly, in some embodiments, a processing circuit (e.g., a circuit including a load/store circuit, a memory management unit (MMU), and/or another circuit) is configured to determine, based on comparing an authentication value to an expected authentication value, whether a memory access error is occurring, and thus, whether a memory instruction is authorized to proceed. In some embodiments, the authentication values include information that indicates that a memory access error is occurring, such as information that indicates whether the memory location has been previously written by a program prior to a read operation from the program. Accordingly, in some embodiments, the processing circuit is configured to determine, based on the content of the authentication value alone, whether the memory instruction is authorized to proceed. In some embodiments, the authentication value includes both color data and content that, alone, can be used to determine whether a memory instruction is authorized to proceed. In such embodiments, a memory access error may be detected if the color data does not match the expected color data, if the authentication value indicates a memory access error, or both.

As used herein, "color data" refers to a numerical sequence of data having a particular pattern. For example, one piece of color data may be the sequence "0110". Another piece of color data may be the sequence "1110". Because "0110" and "1110" are different sequences, the two pieces of color data have different color values and thus do not match. Although these examples refer to four bit color data, color data may refer to a sequence having any length (e.g., a piece of color data may be the sequence "110011").

In various embodiments, authentication values can correspond to different portions of the memory device. For example, in one embodiment, the authentication value corresponds to only a portion (e.g., one eighth) of a cache line of the memory device. In another embodiment, the authentication value corresponds to a full cache line or to multiple cache lines.

Embodiments of the system described herein may store additional data, as compared to a system that stores authentication values in a fixed set of extra bits in a memory cache. Additionally, in embodiments in which the TLB is used to determine the authentication value, a program may not need to include additional software resources (e.g., additional instructions) to utilize the corruption prevention system. Further, because the corruption prevention system utilizes hardware configured to process the memory instruction, detecting a potential memory corruption error may occur more quickly, as compared to a corruption detection system that is solely software-based.

Figure 1:
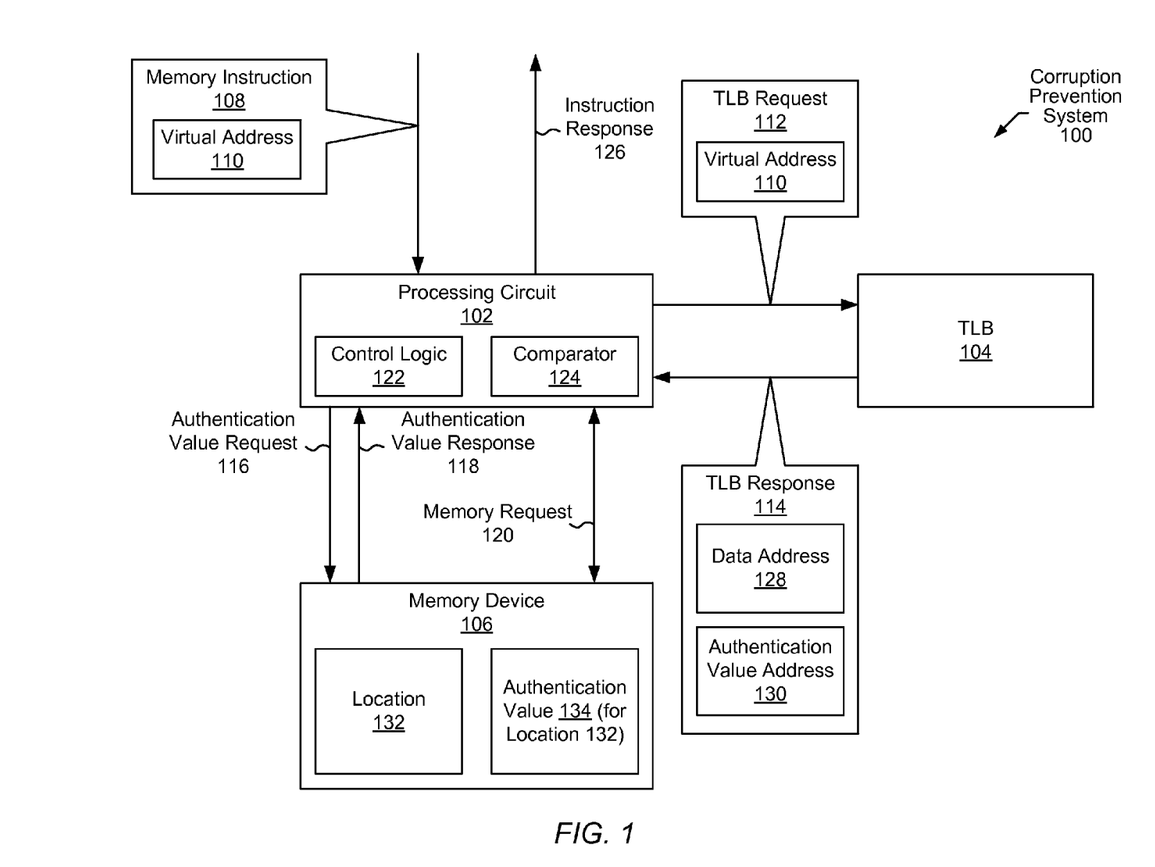
FIG. 1 is a block diagram illustrating one embodiment of an exemplary corruption prevention system.

This disclosure initially describes, with reference to FIG. 1, functions of various portions of an embodiment of a corruption prevention system and then describes various actions taken by the embodiment of the corruption prevention system in response to exemplary memory instruction. Example portions of one embodiment of the corruption prevention system are described with reference to FIG. 2. Example processes performed by one embodiment of the exemplary corruption prevention system in response to various types of memory instructions are described with reference to FIGS. 3 and 4. The techniques and structures described herein, however, are in no way limited to the one or more corruption prevention systems shown in FIGS. 1-4; rather, this context is provided only as one or more possible implementations. A method performed by an embodiment of a corruption prevention system is described with reference to FIG. 5. Finally, an exemplary computing system that includes a corruption prevention system is described with reference to FIG. 6.

Turning now to FIG. 1, a block diagram of one embodiment of an exemplary corruption prevention system 100 is shown. In the illustrated embodiment, corruption prevention system 100 includes processing circuit 102, TLB 104, and memory device 106. Processing circuit 102 includes control logic 122 and comparator 124. Memory device 106 includes location 132 and authentication value 134 for location 132.

Overview

At a high level, corruption prevention system 100 protects against memory corruption from a memory instruction by referring to an authentication value, which can be used to identify a memory access that may result in memory corruption. The authentication value may include several pieces of data. First, in some embodiments, the authentication value may include information ("color data," in some embodiments) which, may be compared to information from an expected authentication value ("expected color data") to detect a memory access error. If the color data differs from the expected color data, corruption prevention system 100 may determine that a memory access error (e.g., a program is attempting to access a storage location not associated with the program) is occurring. Second, in some embodiments, the authentication value may include information ("other program data," in some embodiments) which, by itself, may indicate a memory access error is occurring. For example, the authentication value may indicate that a program is attempting to read a memory location prior to writing a value to that memory location. In some embodiments, the authentication value may include both color data and other program data. In response to detecting an error, corruption prevention system 100 may prevent the memory access from proceeding. Alternatively, if no error is detected, corruption prevention system 100 may allow a memory instruction to proceed, which may lead to the memory instruction completing.

When memory is requested (e.g., by a program running on system 100), memory is allocated to store the data (e.g., location 132) and the authentication value (e.g., authentication value 134) for the data. Additionally, an entry in TLB 104 stores the expected authentication value (in one embodiment, as part of data address 128) as well as a pointer to the actual authentication value (e.g., authentication value address 130). Accordingly, in one embodiment, when that memory location is subsequently accessed by memory instruction 108, TLB request 112 will result in TLB response 114 that includes the expected authentication value and a pointer to authentication value 134. Authentication value request 116 may then occur, which uses a pointer (e.g., authentication value address 130) to the actual authentication value to access actual authentication value 134. The actual authentication value is returned as part of authentication value response 118. Comparator 124, in one embodiment, is configured to compare authentication value 134 with the expected authentication value from TLB 104. Comparator 124, in one embodiment, is configured to determine whether authentication value 134 indicates a memory access error. Corruption prevention system 100, in one embodiment, is configured to allow memory instruction 108 to proceed only if the result of this comparison represents a match between authentication value 134 and the expected authentication value from TLB 104 and if authentication value 134 does not indicate a memory access error. Processing circuit 102 is thus configured to send a result of the memory instruction or an error message to a processor pipeline in response to memory instruction 108.

Device Overview

In some embodiments, processing circuit 102 includes a load/store unit, a memory management unit (MMU), or any combination thereof. Control logic 122 is configured to determine what data to send to the various portions of corruption prevention system 100. Comparator 124 is configured to determine whether memory instruction 108 is authorized to proceed.

In some embodiments, TLB 104 is configured to store at least portions of virtual addresses (e.g., tags) and may further store at least portions of corresponding physical addresses (e.g., data address 128, which may specify an entire physical address or a portion thereof). In some embodiments, TLB 104 is additionally configured to store at least a portion of a corresponding authentication value address (e.g., authentication value address 130). Accordingly, in some cases, in response to receiving TLB request 112, which includes at least a portion of virtual address 110, TLB 104 is configured to provide TLB response 114 that includes at least a portion of a corresponding physical address (e.g., data address 128), at least a portion of a corresponding authentication value address (e.g., authentication value address 130), or both. Alternatively, in some embodiments, TLB 104 is configured to store authentication values, and, in response to a TLB request, TLB 104 is configured to return a corresponding authentication value. In this manner, authentication values may be utilized in corruption prevention system 100 without memory instruction 108 having to specify such authentication values (e.g., as an operand).

Figure 2:
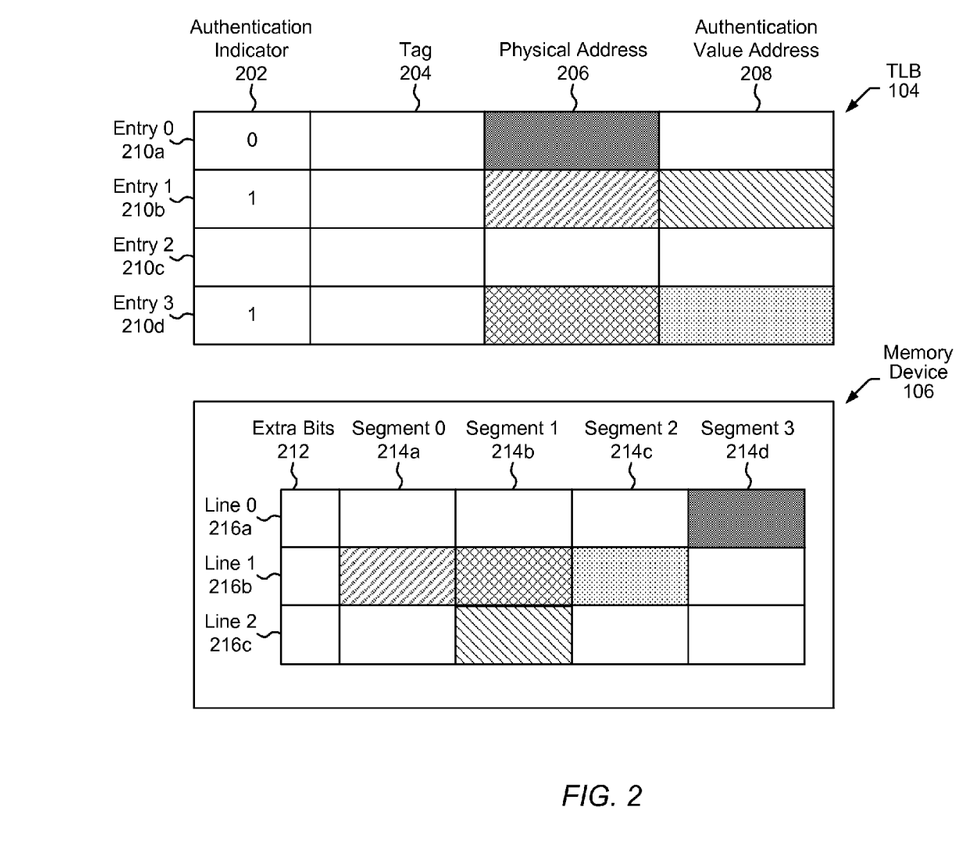
FIG. 2 is a block diagram illustrating one embodiment of an exemplary translation lookaside buffer and an exemplary memory device of a corruption prevention system.

In some embodiments, memory device 106, as further described below with reference to FIG. 2, is configured to store data at particular storage locations and is further configured to store corresponding authentication values. For example, in the illustrated embodiment, memory device 106 includes location 132, which stores data, and also includes authentication value 134, which can be used to determine whether a memory instruction (e.g., memory instruction 108) that addresses location 132 is authorized to proceed. In some embodiments, memory device 106 may be a cache device. In these embodiments, memory device 106 may include groups of one or more extra bits associated with respective cache lines. In the illustrated embodiment, portions of memory device 106 other than the extra bits are used to store authentication values (e.g., authentication value 134). Accordingly, the extra bits may be utilized for purposes other than memory authorization (e.g., storing ECC data, storing data instead of memory locations that are experiencing one or more hardware failures, etc.). Additionally, the memory locations used to store authentication values for a particular cache line may collectively be larger than memory locations for a particular group of one or more extra bits associated with the particular cache line. Accordingly, in some cases, additional authentication data may be stored regarding the particular cache line, and, in some cases, the authentication data may correspond to portions of a cache line (instead of an entire cache line). Although in the illustrated embodiment, location 132 and authentication value 134 are both located in memory device 106, in other embodiments, authentication value 134 may be stored at another device (e.g., TLB 104 or another memory device).

As used herein, the phrase "extra bits" refers to a set of bits in a memory device that are not ordinarily used to store addressable data. For example, "extra bits" may refer to spare bits of a cache line which are used if a bit in the cache line experiences a hard error such as a hardware failure.

In some embodiments, TLB 104 may include more storage space for physical addresses than is needed for memory device 106. At least some of this additional storage space in a particular entry of TLB 104 may be used to store an expected authentication value (e.g., expected color data) corresponding to data stored at a location addressed by the physical address at that entry. For example, suppose memory device 106 includes $2^{60}$ bits and is bit-addressable such that all bits may be individually addressed by respective permutations of a 60 bit address. Further suppose that TLB 104 has sufficiently capacity to store a 64 bit address. In this example, the remaining four bits in each entry may be used to store an expected authentication value such as expected color data.

In embodiments in which TLB 104 devotes more storage space to physical addresses than is needed to address memory device 106, an authentication value generation algorithm (e.g., a library file that can be used by multiple programs) may be called to generate an authentication value in response to a memory allocation request by a program. In some embodiments, the authentication value may include an expected authentication value, such as expected color data. Accordingly, in those embodiments, the authentication value generation algorithm is or includes a coloring algorithm. A coloring algorithm may operate by pseudo-randomly generating expected color data. Alternatively, a coloring algorithm may operate by generating color data for memory locations such that logically adjacent data objects do not have the same color. In some embodiments, the authentication value generation algorithm may include, in the authentication value, data that indicates that the associated location has not been written to.

As used herein, "logically adjacent" data objects refer to data objects that do not have intervening physical addresses. For example, a one-byte data object located at physical address 8 is logically adjacent to a four-bit data object located at physical address 4 and further logically adjacent to a two-byte data object located at physical address 16.

Exemplary Corruption Prevention Setup

In some embodiments, in response to a memory allocation request by a program, the authentication value generation algorithm performs a modified allocation process. In response to the memory allocation request, a memory location is allocated and an initial physical memory address corresponding to the memory location is generated. Additionally, a memory location configured to store an authentication value corresponding to the memory location is allocated. The authentication value generated by the authentication value generation algorithm may be stored at the associated allocated memory location. In embodiments in which TLB 104 devotes more storage space to physical addresses than is needed to address memory device 106, the initial physical memory address may be modified to include the expected authentication value (e.g., expected color data). For example, processing circuit 102 may be configured to treat the four most significant bits of a physical memory address (e.g., data address 128) as expected color data. Accordingly, the authentication value generator algorithm may generate an authentication value and overwrite the four most significant bits of the initial physical memory address with the authentication value. Alternatively, the authentication value generator algorithm may concatenate the authentication value onto the initial physical memory address (or otherwise modify the initial physical memory address such that the authentication value is the four most significant bits of a resulting physical memory address). The resulting physical memory address, the corresponding virtual memory address, and the authentication value address may be stored together. The virtual memory address may be returned in response to the memory allocation request.

In some embodiments, in response to a memory request (e.g., a memory request resulting in a TLB miss or an instruction prediction), a TLB may receive tag information (e.g., at least a portion of a virtual memory address) and a physical memory address of the data. The TLB may further receive an authentication value address. In some embodiments, the physical memory address is a modified physical memory address such that it also includes an authentication value. The TLB may store the received data in an entry of the TLB, and, in response to receiving an authentication value address, may indicate that the physical memory address is associated with an authentication value. In sum, the TLB may store an authentication value address in some embodiments.

Exemplary Corruption Prevention Process

In the illustrated embodiment, processing circuit 102 receives memory instruction 108 (e.g., from a portion of a processing pipeline). In the illustrated embodiment, processing circuit 102 extracts virtual address 110 from memory instruction 108 using control logic 122 and sends virtual address 110 to TLB 104 as part of TLB request 112. TLB request 112 requests a physical address and an authentication value address that correspond to virtual address 110. In response to TLB request 112, TLB 104 identifies that data address 128 and authentication value address 130 are associated with virtual address 110 (e.g., because data address 128, authentication value address 130, and virtual address 110 are part of a single entry of TLB 104). Accordingly, data address 128 and authentication value address 130 may be sent to processing circuit 102 as part of TLB response 114 in response to TLB request 112. In some embodiments, data address 128 includes expected color data. Processing circuit 102 may extract the expected color data from data address 128 in response to TLB response.

In the illustrated embodiment, in response to TLB response 114, processing circuit 102 sends authentication value request 116 (in this case, a read request) and memory request 120 to memory device 106. Authentication value request 116 may include authentication value address 130. In a particular embodiment, memory device 106 may identify authentication value for location 132 134 in response to receiving authentication value address 130. Memory device 106 may send authentication value for location 132 134 to processing circuit 102 as part of authentication value response 118 in response to authentication value request 116. Memory request 120 may include data address 128. In some cases, memory request 120 may also include other data. For example, when memory instruction 108 includes a store instruction, memory request 120 may additionally include data to be stored at memory device 106. In response to memory request 120, memory device 106 may provide data to processing circuit 102 (e.g., in response to a load instruction).

In some embodiments, TLB 104 is configured to receive a portion of virtual address 110 (e.g., a virtual page address) and to provide a portion of data address 128, authentication value address 130, or both (e.g., physical page addresses of data address 128 and authentication value address 130, as opposed to complete physical addresses). In some cases, a value added to authentication value address 130 is scaled based on a ratio between the size of location 132 and the size of authentication value for location 132. For example, in a system having an 8-bit page size, where locations are 4 bits, and authentication values are 2 bits, virtual address 110 may identify bit 4 and data address 128 and authentication value address 130 may identify different pages. Processing circuit 102 may scale virtual address 110 for authentication value address by half, determining that "100" should be added to data address 128 and "010" should be added to authentication value address 130. Additionally, in some embodiments, a number of bits added to data address 128 may differ from a number of bits added to authentication value address 130 (e.g., authentication value address 130 may be larger than data address 128). Accordingly, processing circuit 102 may generate (e.g., using control logic 122) addresses used in authentication value request 116, memory request 120, or both by adding additional bits (e.g., from virtual address 110) to data address 128, to authentication value address 130, or both.

In some embodiments, corruption prevention system 100 is configured such that authentication value address 130 may be mathematically derived using data address 128. For example, authentication value for location 132 134 may be logically adjacent to location 132 or may be a fixed number of bits away from location 132. Accordingly, in some cases, processing circuit 102 may determine authentication value address 130 from TLB response 114 despite TLB response 114 not explicitly including authentication value address.

In some embodiments, as discussed further below, processing circuit 102 uses authentication value for location 132 134 to determine whether memory instruction 108 is authorized to proceed. For example, authentication value for location 132 134 may include color data. Processing circuit 102 may compare, using comparator 124, the color data of authentication value 134 to expected color data extracted from data address 128. In response to the color data of authentication value 134 failing to match the expected color data, processing circuit 102 may determine that a memory access error is occurring and may determine that memory instruction 108 is not authorized to proceed. As another example, memory instruction 108 may request a read of location 132. Authentication value 134 for location 132 may include other program data that indicates whether a program that includes memory instruction 108 has previously written to location 132. If authentication value 134 indicates that the program has not previously written to location 132, processing circuit 102 may determine that a memory access error is occurring and may determine that memory instruction 108 is not authorized to proceed.

In response to processing circuit 102 determining that memory instruction 108 is not authorized to proceed, processing circuit 102 may interrupt memory request 120 or may prevent results of memory request 120 from being output (e.g., as part of instruction response 126) in response to memory instruction 108. In the illustrated embodiment, determining whether memory instruction 108 is authorized to proceed is performed concurrently with memory request 120. Accordingly, in the case of a store request, memory request 120 may not be committed (may not overwrite other data stored at a location addressed by memory request 120) until processing circuit 102 indicates whether memory request 120 is authorized to proceed. However, in other embodiments, processing circuit may not send memory request 120 to memory device 106 until determining that memory request 120 is authorized to proceed.

In some embodiments, in response to determining that memory instruction 108 is not authorized to proceed, processing circuit 102 outputs an error message (e.g., as part of instruction response 126) that indicates data used by processing circuit 102 to determine that memory instruction 108 is not authorized to proceed. For example, in response to the color value of authentication value 134 failing to match an expected color value, processing circuit may output, as part of instruction response 126, the color value and the expected color value. Accordingly, corruption prevention system 100 may prevent potential memory corruption (e.g., memory access errors) from occurring and may further alert programmers that potential memory corruption errors could occur in a system that does not include corruption prevention system 100 or a system where corruption prevention system 100 is not enabled (e.g., by utilizing one or more authentication indicators, as described further below with reference to FIG. 2).

In response to processing circuit 102 determining that memory instruction 108 is authorized to proceed, memory instruction 108 may proceed, which may lead to memory instruction 108 completing. For example, if memory instruction 108 is a load instruction, memory instruction 108 may complete by processing circuit 102 including data stored at location 132 in instruction response 126. As another example, if memory instruction 108 is a store instruction, memory instruction 108 may complete by processing circuit 102 indicating to memory device 106 that a write operation at location 132 may be committed. Accordingly, corruption prevention system 100 allows memory instruction 108 to be executed if no memory corruption error is detected.

Turning now to FIG. 2, a block diagram illustrating one embodiment of TLB 104 and memory device 106 of corruption prevention system 100 is shown. In the illustrated embodiment, TLB 104 includes entries 210a-d. Entries 0-3 210a-d include respective fields that store authentication indicator 202, tag 204, physical address 206, and authentication value address 208. In the illustrated embodiment, memory device 106 is a memory cache including lines 0-2, indicated by reference numerals 216a-c. Lines 216a-c include respective extra bits 212 and segments 0-3, indicated by reference numerals 214a-d. However, in other embodiments, memory device 106 may be a different kind of memory device (e.g., a data store).

As noted above, in some embodiments, TLB 104 provides a physical address and an authentication value address in response to a virtual address. In particular, in response to receiving a TLB request (e.g., TLB request 112 of FIG. 1), TLB 104 may compare a received virtual address portion (e.g., virtual address 110) to respective tags of entries 0-3, indicated by reference numerals 210a-d. In response to detecting a match between the virtual address and a tag of a particular entry, TLB 104 may determine, using respective authentication indicator 202, whether physical address 206 of the particular entry corresponds to an authentication value. For example, in the illustrated embodiment, authentication indicator 202 of entry 210a indicates that respective physical address 206 does not correspond to an authentication value. However, in the illustrated embodiment, authentication indicator 202 of entry 210b indicates that respective physical address 206 correspond to an authentication value that can be retrieved using authentication value address 208.

As noted above, memory device 106 stores data (e.g., data stored at location 132) and corresponding authentication values (e.g., authentication value for location 132 134). The data and authentication values stored at memory device 106 may be addressed by corresponding portions of TLB 104. In the illustrated embodiment, these references are depicted using various patterns. For example, in the illustrated embodiment, physical address 206 of entry 210b refers to segment 214a of line 216b and authentication value address 208 of entry 210b refers to segment 214b of line 216c. The data and authentication values may be stored on a same cache line or on different cache lines. Additionally, multiple entries of TLB 104 (e.g., entry 210b and entry 210d) may include respective physical addresses 206 that address a single line of memory device 106 (e.g., line 216b). Although, in the illustrated embodiment, authentication values are the same size as corresponding data, in other embodiments, authentication values are smaller or larger than corresponding data.

In the illustrated embodiment, extra bits 212 of lines 216a-c are smaller than portions of memory device 106 used to store authentication values (e.g., segment 214c of line 216b and segment 214b of line 216c). Accordingly, more information may be stored in the authentication values, as compared to a system that stores authentication values for each cache line in the respective extra bits. Additionally, in the illustrated embodiment, extra bits 212 may be otherwise used (e.g., used to store ECC data, used to replace a memory location experiencing a hard error such as a hardware failure, etc.) despite authentication values being utilized.

Figure 3:
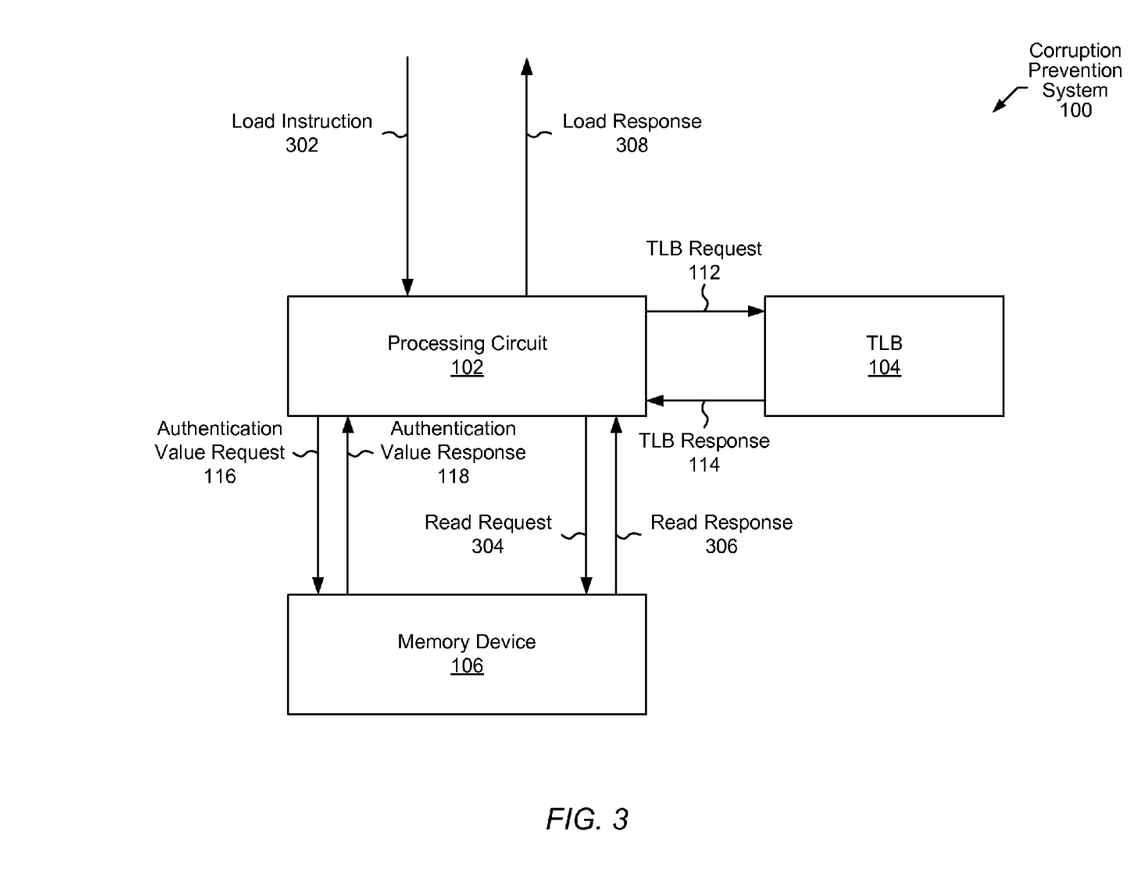
FIG. 3 is a block diagram illustrating example responses to a load instruction by one embodiment of an exemplary corruption prevention system.

Turning now to FIG. 3, a block diagram illustrating exemplary responses to a load instruction by corruption prevention system 100 is shown. Accordingly, processing circuit 102, TLB 104, and memory device 106 of FIG. 1 are shown.

In the illustrated embodiment, processing circuit 102 receives load instruction 302. Load instruction 302 may correspond to memory instruction 108 and may include virtual address 110. As discussed above, processing circuit 102 may obtain data address 128 and authentication value address 130 based on virtual address 110 by communicating with TLB 104. Processing circuit 102 may send authentication value address 130 to memory device 106 as part of authentication value request 116. Additionally, processing circuit 102 may send data address 128 to memory device 106 as part of read request 304.

In response to authentication value request 116, processing circuit 102 may receive, from memory device 106, authentication value response 118, which may include a corresponding authentication value. Processing circuit 102 may determine, based on the corresponding authentication value, whether load instruction 302 is authorized to proceed. In response to determining that load instruction 302 is authorized to proceed, processing circuit 102 may send data from read response 306 as part of load response 308 in response to load instruction 302.

In some embodiments, in response to determining that load instruction 302 is not authorized to proceed, processing circuit 102 may prevent load instruction 302 from completing. For example, processing circuit 102 may receive, in response to read request 304, read response 306, which contains data corresponding to read request 304. However, in response to determining that load instruction 302 is not authorized to proceed, processing circuit 102 may not send the data corresponding to read request 304 as part of load response 308. Alternatively, in some embodiments, processing circuit 102 may not send read request 304 to memory device 106 until after determining that load instruction 302 is authorized to proceed. Accordingly, in response to determining that load instruction 302 is not authorized to proceed, processing circuit 102 may not send read request 304 to memory device. Additionally, in some embodiments, in response to determining that load instruction 302 is not authorized to proceed, processing circuit 102 may send an error message as part of load response 308.

Figure 4:
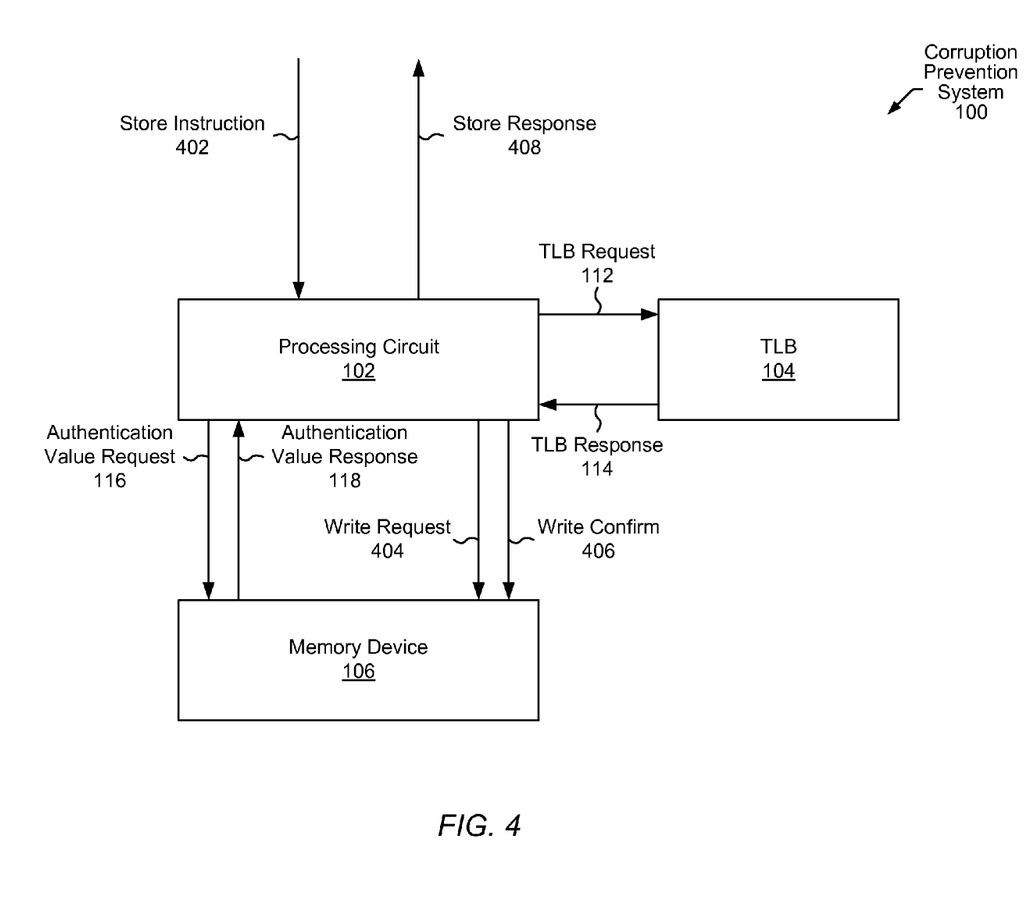
FIG. 4 is a block diagram illustrating example responses to a store instruction by one embodiment of an exemplary corruption prevention system.

Turning now to FIG. 4, a block diagram illustrating exemplary responses to a store instruction by corruption prevention system 100 is shown. Accordingly, processing circuit 102, TLB 104, and memory device 106 of FIG. 1 are shown.

In the illustrated embodiment, processing circuit 102 receives store instruction 402. Store instruction 402 may correspond to memory instruction 108 and may include virtual address 110. As discussed above, processing circuit 102 may obtain data address 128 and authentication value address 130 based on virtual address 110 by communicating with TLB 104. Processing circuit 102 may send authentication value address 130 to memory device 106 as part of authentication value request 116. Additionally, processing circuit 102 may send data address 128 to memory device 106 as part of write request 404.

In response to authentication value request 116, processing circuit 102 may receive, from memory device 106, authentication value response 118, which may include a corresponding authentication value. Processing circuit 102 may determine, based on the corresponding authentication value, whether store instruction 402 is authorized to proceed.

In some embodiments, memory device 106 does not delete data stored at a location addressed by write request 404 until processing circuit 102 confirms that store instruction 402 is authorized to proceed. For example, memory device 106 may back up data at a location addressed by write request 404 or may not immediately write the data of write request 404. In response to determining that store instruction 402 is authorized to proceed, processing circuit 102 may send, to memory device 106, write confirm 406, confirming that store instruction 402 is authorized to proceed. In other embodiments, write request 404 may not be sent until after processing circuit 102 determines that store instruction 402 is authorized to proceed; thus, write confirm 406 may not be used in this instance. In response to write request 404 successfully completing, processing circuit 102 may send store response 408 to a portion of a processing pipeline.

In some embodiments, in response to determining that store instruction 402 is not authorized to proceed, processing circuit 102 may prevent store instruction 402 from completing. For example, after sending write request 404, in response to determining that store instruction 402 is not authorized to proceed, processing circuit 102 may not send write confirm 406 or may indicate that write request 404 is not authorized to proceed. Alternatively, in some embodiments, processing circuit 102 may not send write request 404 to memory device 106 until after determining that store instruction 402 is authorized to proceed. Accordingly, in response to determining that store instruction 402 is not authorized to proceed, processing circuit 102 may not send write request 404 to memory device. Additionally, in some embodiments, in response to determining that store instruction 402 is not authorized to proceed, processing circuit 102 may send an error message as part of store response 408.

Figure 5:
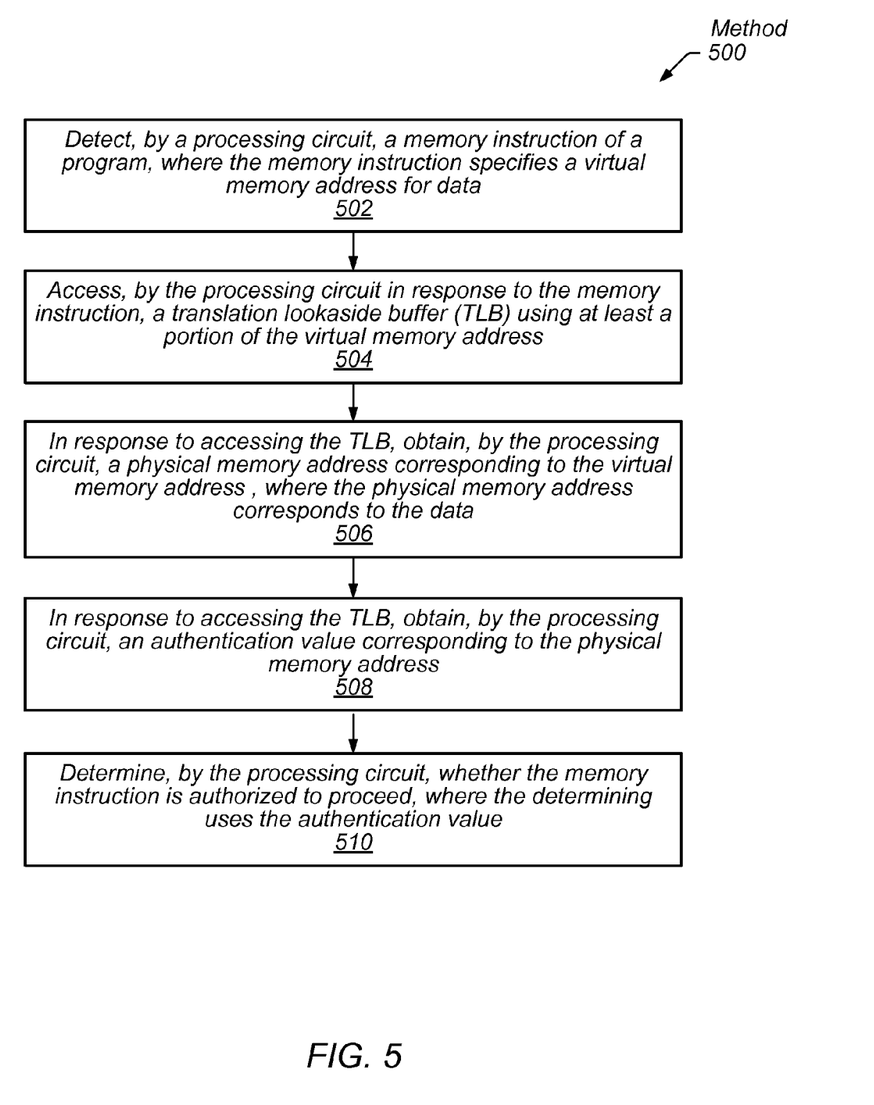
FIG. 5 is a flow diagram illustrating one embodiment of a method of operating a corruption prevention system.

Turning now to FIG. 5, a flow diagram of a method 500 of operating a corruption prevention system is depicted. Method 500 is an embodiment of a method of operating a corruption prevention system, such as corruption prevention system 100 of FIG. 1. Some portions of method 500 may be performed in other orders or simultaneously.

At 502, method 500 includes detecting, by a processing circuit, a memory instruction of a program, where the memory instruction specifies a virtual memory address for data. For example, method 500 may include processing circuit 102 detecting memory instruction 108, where memory instruction 108 specifies virtual address 110.

At 504, method 500 includes accessing, by the processing circuit in response to the memory instruction, a TLB using at least a portion of the virtual memory address. For example, method 500 may include processing circuit 102 sending TLB request 112 to TLB 104, where TLB request 112 includes at least a portion of virtual address 110.

At 506, method 500 includes, in response to accessing the TLB, obtaining, by the processing circuit, a physical memory address corresponding to the virtual memory address, where the physical memory address corresponds to the data. For example, method 500 may include processing circuit 102 obtaining, from TLB 104 in response to TLB request 112, data address 128, where data address 128 corresponds to data stored at location 132.

At 508, method 500 includes in response to accessing the TLB, obtaining, by the processing circuit, an authentication value corresponding to the physical memory address. For example, method 500 may include processing circuit 102 obtaining, based on virtual address 110, authentication value 134 (for location 132) (e.g., using authentication value address 130).

At 510, method 500 includes determining, by the processing circuit, whether the memory instruction is authorized to proceed, where the determining uses the authentication value. For example, method 500 may include processing circuit 102 determining whether memory instruction 108 is authorized to proceed using authentication value 134. In some cases, determining whether the memory instruction is authorized to proceed may be based on the authentication value alone (e.g., determining whether the authentication value indicates that the program has previously written to the physical memory address). In other cases, determining whether the memory instruction is authorized to proceed is based on other values (e.g., based on a comparison between the authentication value and an expected authentication value).

Figure 6:
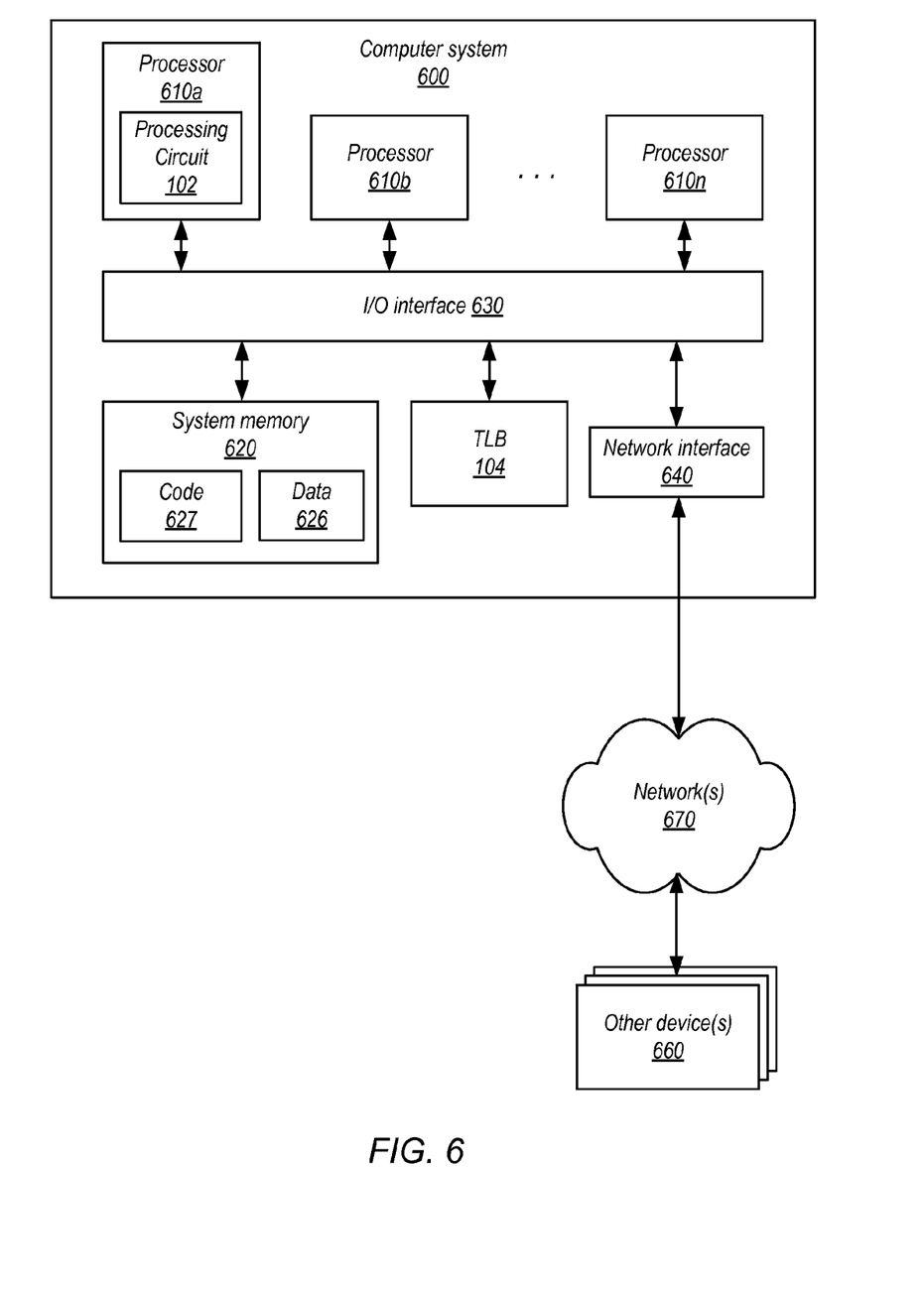
FIG. 6 is a block diagram illustrating an embodiment of an exemplary computing system that includes a corruption prevention system.

One embodiment of a computer system configured to implement at least a portion of a memory corruption prevention system such as corruption prevention system 100 of FIG. 1 is shown in FIG. 6. In the illustrated embodiment, the computer system 600 includes one or more processors 610a-n coupled to system memory 620 via input/output (I/O) interface 630. Computer system 600 further includes network interface 640 coupled to I/O interface 630.

In various embodiments, computer system 600 may be a uniprocessor system including one processor 610a, or a multiprocessor system including several processors 610a-n (e.g., two, four, eight, or another suitable number). Processors 610a-n may be any suitable processors capable of executing instructions. For example, in various embodiments, processors 610a-n may be general-purpose or embedded processors implementing any of a variety of instruction set architectures (ISAs), such as the x86, PowerPC, SPARC, or MIPS ISAs, or any other suitable ISA. In multiprocessor systems, each of processors 610a-n may commonly, but not necessarily, implement the same ISA. One or more of processors 610a-n may include at least a portion of a memory corruption prevention system. For example, in the illustrated embodiment, processor 610a includes processing circuit 102 of FIG. 1. However, in other embodiments, other processors may additionally include respective processing circuits. Additionally, in some embodiments, one or more of processors 610a-n may include one or more memory devices (e.g., memory device 106).

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for memory corruption prevention, are shown stored within system memory 620 as code 627 and data 626. In some embodiments, system memory 620 includes or corresponds to memory device 106 of FIG. 1. In other embodiments, memory device 106 is located elsewhere in computer system 600 (e.g., connected to I/O interface 630 or a peripheral device connected to network interface 640). System memory 620 may be addressable by TLB 104 translating virtual addresses into physical addresses of system memory 620.

In one embodiment, I/O interface 630 is configured to coordinate I/O traffic between processors 610*a-n*, system memory 620, and any peripheral devices in the device, including network interface 640 or other peripheral interfaces. In some embodiments, I/O interface 630 performs protocols, timing or other data transformations to convert data signals from one component (e.g., system memory 620) into a format suitable for use by another component (e.g., processor 610*a*). I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into a processor 610.

Network interface 640 may be configured to allow data to be exchanged between computer system 600 and other devices 660 attached to a network or networks 670. In various embodiments, network interface 640 may support communication via any suitable wired or wireless general data networks, such as types of Ethernet network, for example. Additionally, the network interface 640 may support communication via telecommunications/telephony networks such as analog voice networks or digital fiber communications networks, via storage area networks such as Fibre Channel SANs, or via any other suitable type of network and/or protocol.

In some embodiments, the system memory 620 may be one embodiment of a computer-accessible medium configured to store program instructions and data as described above for FIGS. 1 through 5 for operating a corruption prevention system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   detecting, by a processing circuit, a memory instruction of a program, wherein the memory instruction specifies a virtual memory address for data;
   accessing, by the processing circuit in response to the memory instruction, a translation lookaside buffer (TLB) using at least a portion of the virtual memory address;
   in response to accessing the TLB, obtaining, by the processing circuit, a physical memory address corresponding to the virtual memory address, wherein the physical memory address corresponds to the data;
   in response to accessing the TLB, obtaining, by the processing circuit, an authentication value corresponding to the physical memory address; and
   determining, by the processing circuit, whether the memory instruction is authorized to proceed, wherein the determining uses the authentication value.

2. The method of claim 1, wherein determining whether the memory instruction is authorized to proceed comprises:
   determining an expected authentication value from the physical memory address; and
   comparing the authentication value to an expected authentication value.

3. The method of claim 2, further comprising, in response to the authentication value differing from the expected authentication value:
   preventing, by the processing circuit, the memory instruction from proceeding; and
   generating, by the processing circuit, an error message corresponding to the memory instruction.

4. The method of claim 2, wherein determining the expected authentication value comprises extracting the expected authentication value from at least a portion of the physical memory address stored in the TLB.

5. The method of claim 1, wherein obtaining the authentication value comprises:
   obtaining a physical memory address of the authentication value; and obtaining, from a memory device based on the physical memory address of the authentication value, the authentication value.

6. The method of claim 5, wherein obtaining the physical memory address of the authentication value comprises deriving the physical memory address of the authentication value from the physical memory address of the data.

7. The method of claim 5, wherein obtaining the physical memory address of the authentication value comprises receiving at least a portion of the physical memory address of the authentication value from the TLB.

8. The method of claim 1, further comprising providing, by the processing circuit, the physical memory address to a memory cache, wherein the memory cache maps the physical memory address to a storage location within a cache line of the memory cache, wherein a second storage location within the cache line corresponds to a second authentication value, and wherein the second authentication value differs from the authentication value.

9. The method of claim 1, wherein the memory instruction is a read instruction and wherein the authentication value indicates whether the physical memory address has been previously written to by the program that includes the memory instruction.

10. The method of claim 1, further comprising, prior to receiving the memory instruction:
    allocating a memory location, wherein at least a portion of the memory location is addressed by an initial physical memory address;
    determining the authentication value; and
    modifying the initial physical memory address to generate the physical memory address such that the physical memory address includes the authentication value.

11. The method of claim 10, wherein determining the authentication value includes generating the authentication value such that the authentication value differs from one or more other authentication values corresponding to one or more other physical memory addresses that are logically adjacent to the physical memory address.

12. The method of claim 10, wherein determining the authentication value includes pseudo-randomly generating the authentication value.

13. A system, comprising:
    a memory device that includes a plurality of storage locations configured to store a plurality of data values and a corresponding plurality of authentication values;
    a translation lookaside buffer (TLB) configured, in response to receiving a portion of a virtual address that matches a tag stored in an entry of the TLB, to provide a TLB response that includes a portion of a physical address stored in the entry; and
    a load/store circuit configured to:
        in response to receiving a memory instruction that includes a particular virtual memory address of data, obtain, using a corresponding TLB response, a particular physical address of the data and a particular address of a corresponding authentication value;
        determine, based on the particular physical address of the data, an expected authentication value corresponding to the memory instruction;
        request, from the memory device using the particular physical address of the corresponding authentication value, a particular authentication value corresponding to the memory instruction;
        determine whether the particular authentication value matches the expected authentication value; and
        in response to the particular authentication value matching the expected authentication value, commit the memory instruction.

14. The system of claim 13, wherein the TLB is further configured, in response to receiving the portion of the virtual address, to include, in the TLB response, an authentication value address that corresponds to the stored tag.

15. The system of claim 13, wherein the plurality of storage locations are a plurality of cache lines, and wherein, in response to a particular bit of a particular cache line of the memory device experiencing a hardware error, the memory device is configured to store a data value at the cache line using an extra bit of the cache line, and to store a corresponding authentication value.

16. The system of claim 13, wherein the memory device is configured to store at least a portion of error correcting code (ECC) data using an extra bit of a cache line, and wherein the memory device is configured to store a data value using the cache line, and to store a corresponding authentication value.

17. An apparatus, comprising:
    a translation lookaside buffer (TLB) including a plurality of TLB entries, wherein a particular TLB entry comprises:
        a tag storage location configured to store a virtual memory address;
        a physical address storage location configured to store a physical address that corresponds to the virtual memory address; and
        an authentication value address storage location configured to store an address of an authentication value that corresponds to the physical address storage location.

18. The apparatus of claim 17, wherein the TLB is configured, in response to receiving a TLB request that includes a virtual memory address that does not correspond to a virtual memory address stored at the TLB, to:
    retrieve a physical address corresponding to the TLB request; and
    retrieve an address of a corresponding authentication value.

19. The apparatus of claim 17, wherein the particular TLB entry further comprises an authentication availability storage location configured to store an authentication indicator that indicates whether the virtual memory address corresponds to an authentication value.

20. The apparatus of claim 19, wherein the TLB is configured, in response to a TLB request that identifies the particular TLB entry and in response to the authentication indicator indicating that the virtual memory address does not correspond to an authentication value, to prevent data stored at the authentication value address storage location from being included in a TLB response.

* * * * *